United States Patent
Meng et al.

(10) Patent No.: US 6,496,262 B1
(45) Date of Patent: Dec. 17, 2002

(54) HOLOGRAPHIC PARTICLE IMAGE VELOCIMETRY APPARATUS AND METHODS

(75) Inventors: Hui Meng, East Amherst, NY (US); Ye Pu, Buffalo, NY (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 09/350,827

(22) Filed: Jul. 9, 1999

Related U.S. Application Data (60) Provisional application No. 60/092,298, filed on Jul. 10, 1998.

(51) Int. Cl.⁷ .............................................. G01B 9/021
(52) U.S. Cl. ....................................... 356/457; 356/339
(58) Field of Search ................................ 356/457–458, 356/28, 28.5, 339

(56) References Cited

U.S. PATENT DOCUMENTS

| | | | |
|---|---|---|---|
| 5,532,814 A | | 7/1996 | Cha |
| 5,548,419 A | | 8/1996 | Adrian et al. |
| 5,905,568 A | * | 5/1999 | McDowell et al. ........... 356/28 |
| 6,078,392 A | * | 6/2000 | Thomas et al. ............ 356/348 |

OTHER PUBLICATIONS

Gray, C. and C.A. Greated. "A Processing System for the Analysis of Particle Displacement Holograms," SPIE vol. 2005, 1993, 636–647.

Applicant Ezel INC., "Flowing Velocity Measurement System," European Patent Application No. 90123017.7, publication No. 0436125A1, filed on Nov. 30, 1990.

Hart, Douglas P. "High–Speed PIV Analysis Using Compressed Image Correlation," Journal of Fluids Engineering 120, Sep. 1998, pp. 463–470.

Zhang, J., B. Tao, J. Katz. "Turbulent Flow Measurement in a Square Duct with Hybrid Holographic PIV," Experiments in Fluids 23, 1997, pp. 373–381.

Lozano, A., J. Kostas, J. Soria. "Use of Holography in Particle Image Velocimetry Measurements of a Swirling Flow," Experiments in Fluids 27, 1999, pp. 251–261.

Barnhart, Donald H., Ronald J. Adrian, and George C. Papen. "Phase–Conjugate Holographic System for High–Resolution Particle–Image Velocimetry," Applied Optics 33(30), Oct. 1994, 7159–7170.

* cited by examiner

Primary Examiner—Frank G. Font
Assistant Examiner—Philip Sana Natividad
(74) Attorney, Agent, or Firm—Jennifer L. Bales; Macheledt Bales LLP (57) ABSTRACT

The proposed holographic particle image velocimetry (HPIV) system employs holograms of two time-separated particle fields, illuminated by separate reference beams on a single recording medium. 90-degree scattering is utilized for the object wave, in order to improve Numerical Aperture and resolve the third dimension of the hologram. The proposed HPIV system then uses substantially the same optical geometry for the reconstruction process. A CCD camera is utilized to extract particle subimages, thin slice by thin slice, and a centroid-finding algorithm is applied to extract centroid locations for each volume. The concise cross correlation (CCC) algorithm for extracting velocity vector fields from the centroid data is an important enabling feature of the proposed system. Correlations are calculated between subsets of centroids representing the images or cubes, and velocity vectors are computed from the individual correlations. Higher spatial resolution can also be obtained by pairing particle centroids individually.

14 Claims, 7 Drawing Sheets

HOLOGRAPHIC PARTICLE IMAGE VELOCIMETRY APPARATUS AND METHODS

This application claims the benefit of U.S. Provisional Application No. 60/092,298, filed Jul. 10, 1998.

This invention was made with United States Government Support under National Science Foundation Grant No. CTS-9625307. The Government may have certain rights in this invention.

BACKGROUND OF THE INVENTION

1. Field of the Invention

This invention relates to methods and apparatus for measurements of displacements or velocities of particle fields from double-exposure particle images or holograms.

2. Description of the Related Art

In application areas such as aircraft and automobile design, chemical, material, drug and food manufacture, environmental control, power generation, and biomedical engineering, there is a ubiquitous need to measure three dimensional velocity fields in turbulent, complex fluid flows. Such information is critical to the modeling and control of various flows of technological importance.

In many such applications, measurement of the displacement of small markers/tracers (either particles or speckles) in full field is required. Such full-field measurement capability was lacking until the establishment and commercialization of the Particle Image Velocimetry (PIV) technique a few years ago. In the PIV technique, a pair of images is captured within a short time interval, and the particle displacement from the two images is computed. The time interval is chosen so that the displacement during that time period is small enough to approximate the instantaneous velocity. Applications of this sort of velocimetry include deformation gauging of speckle-sprayed surfaces of deformable solid objects, velocity measurement of the discrete phase (solid particles, droplets, and bubbles) in a two-phase flow, and continuous-phase fluid flows seeded with particles.

For these applications, variation in the local densities of tracer particles presents a problem. Commercial instruments like PIV use Fast Fourier Transform (FFT)-based correlation to estimate the degree of displacement of a small group of tracer particles; in fact, FFT-based correlation is the only correlation technique available in commercial systems. Since velocity vectors obtained using FFT-based correlation are based on average over groups of tracer particles, information about individual particles is lost, resulting in a limited spatial resolution for the extracted velocity field. Where particles are especially sparse, FFT-based correlation methods fail completely; such local inhomogeneities, however, are unavoidable in complex, turbulent flows.

PIV measurements are limited to two planes. For truly three dimensional flow field measurements, it is necessary to use Holgraphic Particle Image Velocimetry (HPIV), a new technique currently under development at several leading laboratories around the world, including the Laser Flow Diagnostics Laboratory at Kansas State University. HPIV works by recording the instantaneous 3-dimensional images of a large quantity of tracer particles in a fluid volume recorded on a hologram, and then reconstructing the particle images optically. The instantaneous volumetric velocity field can be retrieved by finding the displacements of the particles in the image volume during the period between exposures. Applied in conjunction with cinematography, simultaneously time- and space-resolved measurements in three dimensions are possible.

In practice, a number of serious issues stand in the way of the commercial use of HPIV for measuring three-dimensional fluid motion. HPIV configurations are broadly classifiable, based on the holographic system, as either "in-line" or "off-axis". In in-line systems, only one beam is employed to produce both the object wave (scattered component) and the reference wave (unscattered component). While the optical geometry of in-line systems is simple enough for use in commercial systems, in-line HPIV systems suffer from speckle to an extent which makes it impossible to resolve particle images in sufficient detail for most commercial applications. Furthermore, in-line particle images are formed with an extremely narrow forward scattering lobe. Due to such small Numerical Aperture (N.A.), the particle images suffer from large depth of focus. Off-axis systems produce holograms with better SNR, at the expense of simplicity of optical geometry. Many variations on the themes of in-line versus off-axis imaging systems are possible, so that the distinction between them can become blurred.

Finally, a major challenge to commercial HPIV applications has been the magnitude of the data processing task. The amount of data being processed at a given time is exorbitantly large, and particularly so in the case of HPIV. The data volume one needs to address is typically on the order of 100 Gigabytes with FFT-based methods, which utilize the full three-dimensional volume. Such a large volume of data cannot be processed fast enough, or stored at an acceptable cost for velocity extraction; thus the advent of HPIV demands a more efficient solution to the data storage and processing problem. Ongoing research in the area of PIV data processing has focused on addressing these problems with sophisticated techniques, such as neural nets, fuzzy logic, and genetic algorithms, but these methods have not yet met with practical success.

In standard FFT-based cross-correlation methods the displacement estimate is obtained by applying FFTs to both a target window (for two dimensional PIV systems) or cube (for three dimensional HPIV systems) and a search window or cube. The cross correlation is then calculated in the frequency domain by multiplication, and inversion of the result gives the location of the correlation peak. One disadvantage of this method is that the correlation peak is the optimal displacement for the particles based on mean group displacement throughout the target and search windows/cubes; this means that finer particle displacement data are unrecoverable by this method. In fact, FFT-based correlation may fail completely in windows or cubes where the seeding density is low. Most importantly, the quantity of data to be handled in the case of HPIV excludes the use of FFT-based correlation methods; a typical 100-Gigabyte block of data would take thousands of hours to process by this means. New data processing techniques are therefore demanded, which require less computational power and less data storage capacity.

Space domain cross-correlation methods for PIV and HPIV, which have been researched but have not been commercially implemented, may require the calculation of particle centroids. Various approaches to the problem of finding particle centroids have been taken; most try to minimize computation. In one such implementation, the entire image is scanned, and pixels with intensity higher than a specified threshold are set aside for further computation (the threshold is determined adaptively from the image histogram). For each eligible pixel, a list of preexisting centroids is scanned; if the new pixel is sufficiently close to a preexisting pixel, then the pixels are combined by intensity-weighted averaging to form a new centroid. If the new pixel is isolated, it is added to the list of particle centroids.

No system currently available is capable of processing particle fields for velocimetry in an efficient manner, while retaining the ability to track specific particles. A need remains in the art for such a system.

A number of obstacles have prevented HPIV from becoming reliable and practical. Hence, despite a need in several industries for 3D flow measurements, commercial HPIV systems have not been available.

A need also remains in the art for a workable optical configuration for HPIV, which combines the simplicity of in situ reconstruction with high image quality and easy optical access.

A need also remains in the art for a data processing system which takes full advantage of the 3D holographic images, handles the large quantity of 3D data involved, and delivers particle information and velocity fields efficiently.

SUMMARY OF THE INVENTION

It is an object of the present invention to provide a holographic particle imaging system that is capable of extracting three-dimensional detail from the flow field, including but not limited to individual particle sizes, shapes, displacements, velocities and concentrations.

Another object of the present invention is to provide a workable optical configuration for HPIV, which combines the simplicity of in situ reconstruction with high image quality and easy optical access. The present HPIV configuration's 90-degree scattering feature permits optical access approaching that of planar PIV, which has been widely accepted.

A further object of the present invention is to provide a system with high compression ratios for the data to be processed, together with an efficient velocity field extraction algorithm. The use of particle centroids for velocity field extraction, rather than the image data extracted from the hologram as is used in some HPIV systems, permits the use of less storage and active memory, which speeds the processing of the data. Furthermore, retaining the spatial locations of the particle centroids permits particle pairing to be done after extraction of the major features of the flow; clearly this provides the best possible resolution of the velocity vector field.

To achieve these objects, there is provided a system for the holographic recording of three-dimensional images of a fluid seeded with particles, and for the extraction of the velocity vector field defined by the motion of the fluid. The system includes the specification of an off-axis holographic system utilizing 90-degree scattering to obtain low depth of focus and high SNR, in situ reconstruction of the time-separated holograms, extraction of the particle centroid locations from the time-separated holograms, and a velocity field extraction algorithm which uses particle centroid data, rather than digital images captured from the hologram, to perform the correlations needed to calculate the three-dimensional velocity vector field.

The system utilizes an object beam and two reference beams that are directed onto the holographic recording medium from different reference angles. The different reference angles permit the particle fields recorded at different points of time, t1 and t2=t1+dt, to be unambiguously distinguished from each other. The object wave is obtained by directing a third coherent wavefront at an angle perpendicular to the vector between the particle field and the single recording medium, so that the 90-degree scattering component from this beam interferes with first one reference beam at time t1, and then the other reference beam at time t2=t1+dt. The use of two angularly separated reference waves permits the time-separated holograms to be recorded on a single holographic recording medium. This system geometry results in an improved Numerical Aperture and depth of focus, allowing three-dimensional information to be effectively extracted from the resulting holograms.

The complexity of the imaging system is somewhat ameliorated by the in situ reconstruction scheme, which uses substantially the same optics for reconstruction of the time-separated holograms. The two reference beams are recreated in exactly the same geometry used for recording; the holographic recording medium is placed in the same position with the emulsion facing in the opposite direction, so that the incident reference waves are effectively the phase-conjugates of the original reference waves. The object wave is not needed in the reconstruction process, and so is blocked. The reconstructed images are displayed alternately, on the opposite side of the holographic emulsion, by illuminating the emulsion alternately with the two reference beams.

The system then utilizes an imaging system which alternately interrogates the three-dimensional volumes reconstructed by the two reference beams. A CCD camera on a three-dimensional traverse system, with a small depth of focus, is and acquires planar images by scanning synchronized with the laser. The CCD camera alternately extracts intensity data from the two holograms, taking a thin slice in the depth dimension, and small areas in the planar dimension. This gives rise to a natural three-dimensional grid on each volume. The processor then employs standard particle centroid extraction algorithms to save the three-dimensional location of each particle centroid in the intensity map. The concise cross correlation algorithm (CCC) is then utilized to extract a velocity vector field defined on this grid.

CCC extracts velocity vector fields by measuring displacement in 2-dimensional and 3-dimensional media, including, but not limited to, fluid flows. In the preferred embodiment, particle centroid coordinates are extracted from each pair of images, or from image planes in the hologram. The coordinates alone are retained in the processing that follows, saving both compute time and memory. The first cube is naturally broken into target windows (cubes) by the volume interrogation process. These cubes are sufficiently small that their velocity fields are roughly constant at that scale. The correlation of each window (cube) with a region in the second image (cube) is calculated. The correlation is calculated on the basis of particle centroids alone, with correlation intensities between individual particles being calculated as a decreasing function of distance. Translations are calculated by manipulating centroid coordinates.

To accelerate computation, three 1-dimensional correlations are calculated in place of a complete 3-dimensional correlation. The velocity vectors are obtained by combining x-, y-, (z-) components obtained from the individual correlations. The highest possible spatial resolution can then be obtained, if desired, by translating the images by the extracted velocity and pairing particle centroids individually.

The entire computation can be performed in integer arithmetic only, which means that CCC can be implemented easily on hardware platforms for real-time applications. The method is robust, and much faster than the FFT-based methods in common use.

DETAILED DESCRIPTION OF THE PREFERRED EMBODIMENTS

Figure 1:
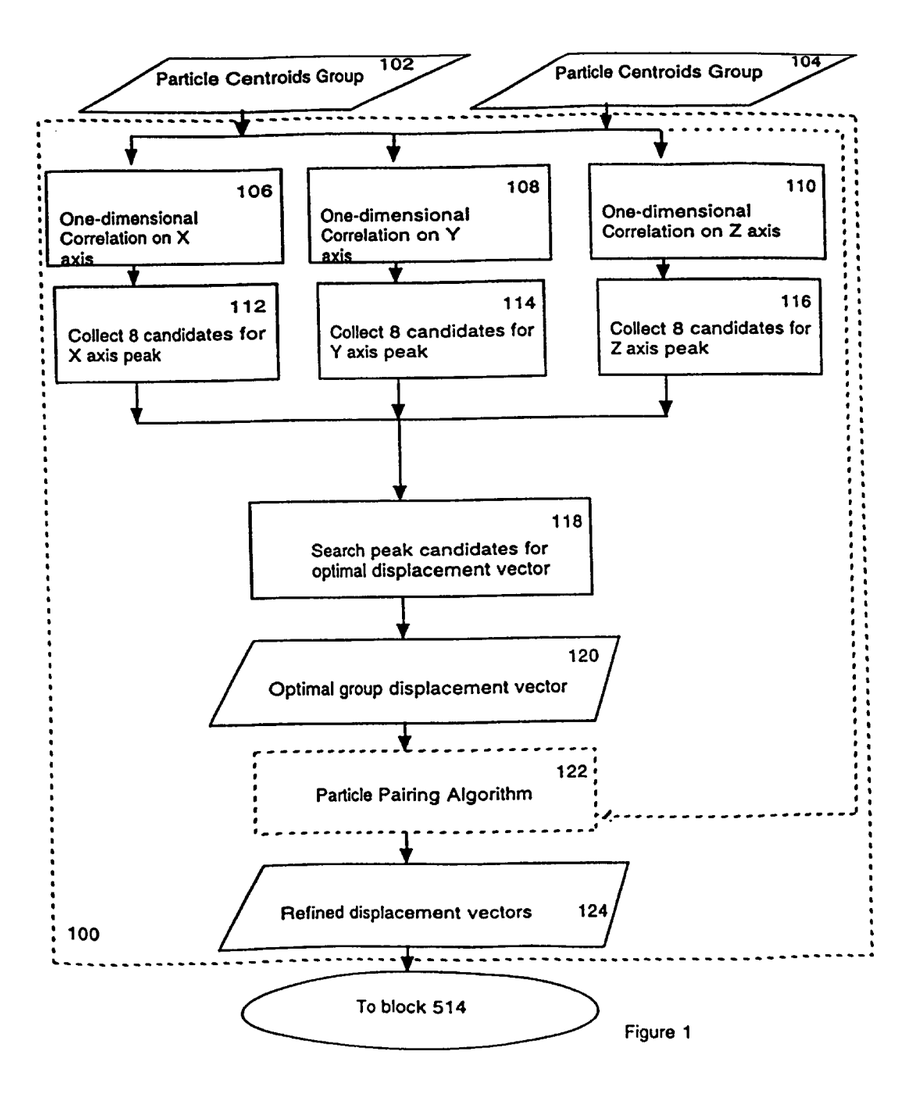
FIG. 1 is a flow diagram of the main CCC algorithm.
Figure 5:
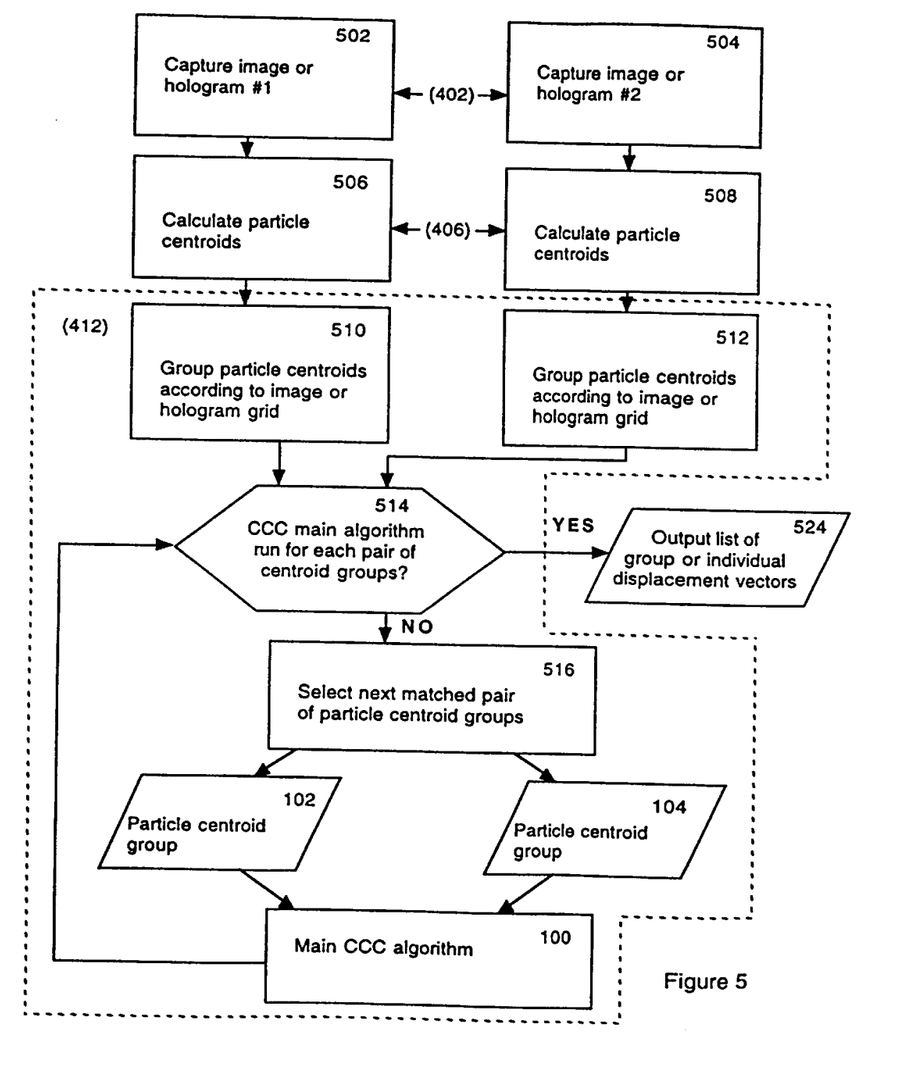
FIG. 5 is a flow diagram of the CCC algorithm of FIG. 1 applied to the entire measurement volume.

FIG. 1 is a flow diagram showing the main Concise Cross Correlation (CCC) algorithm 100 of the present invention, for a small window (for two dimensional processing) or cube (for three dimensional processing) of data. The specific example shown in FIG. 1 illustrates three dimensional processing. It will be appreciated by those skilled in the art that two dimensional processing is very similar, merely requiring removing the processing in the z axis. FIG. 5 shows how the CCC algorithm of FIG. 1 is implemented over the entire range of data. Note that parallelograms in the flow diagrams represent data inputs or outputs.

The primary purpose of the main CCC algorithm 100 shown in FIG. 1 is to calculate the optimal group displacement vector for the two sets of particle centroids 102, 104 which are provided to CCC algorithm 100 for processing. Two large groups of particle centroids were previously computed by extracting particle centroids (using conventional methods) from two entire image exposures (for two dimensional processing) or hologram exposures (for three dimensional processing, as shown in FIG. 1) which are separated in time by a few milliseconds, in the preferred embodiment. This is a time difference so small that there is little deviation from a constant velocity assumption in a sufficiently small window or cube.

The smaller groups of centroids 102, 104 submitted to CCC algorithm 100 are typically calculated by subdividing image data obtained via PIV into for example 1024 (32 by 32) smaller windows or cells, or by subdividing hologram data obtained via HPIV into for example 12500 (25 by 20 by 25) smaller cubes. The optimal group displacement vector estimate which is the principle output of CCC algorithm 100 may, if desired, be further refined into estimates of individual particle displacements, using the optional particle pairing algorithm in step 122 (this step is shown in more detail in FIG. 3).

Blocks 102 and 104 represent the input to CCC program 100 of small groups of particle centroids extracted from images (or holograms), which are captured by the PIV (HPIV) system. In steps 106, 108, and 110, particle centroid groups 102 and 104 are submitted to one-dimensional correlations on the X axis, Y axis, and Z axis respectively. The correlation steps are shown in detail in FIG. 2. In steps 112, 114, and 116, a set number (8 in the prototype implementation) of correlation peaks on the X-axis, Y-axis and Z-axis are collected from the output of steps 106, 108, and 110, and are then submitted to step 118.

In step 118, the optimal group displacement vector is calculated. The correlation peaks collected in steps 112, 114, and 116 are used to form 64 candidate vectors for the optimal group displacement vector in the case of PIV, and 512 candidate vectors in the case of HPIV. For each of these candidate vectors, the actual two- or three-dimensional correlation value is computed and the vector giving the maximum correlation is chosen as the optimal group displacement vector. It is then passed on to the remainder of the algorithm in block 120.

Either the group displacement vector is regarded as the final output of the main CCC algorithm, or it is passed on, along with particle centroid groups 102 and 104, to the optional particle pairing algorithm 122. This algorithm associates each particle centroid in group 102 with a particle centroid in group 104, thereby refining the optimal group displacement vector into individual particle displacement vectors. The particle pairing algorithm is described in detail in FIG. 3. Block 124 represents the output of the particle pairing algorithm, which is a complete list of paired particles extracted from particle centroid groups 102 and 104 (equivalently, a complete list of individual particle displacement vectors). The main CCC routine then exits to block 514 (see FIG. 5).

Figure 2:
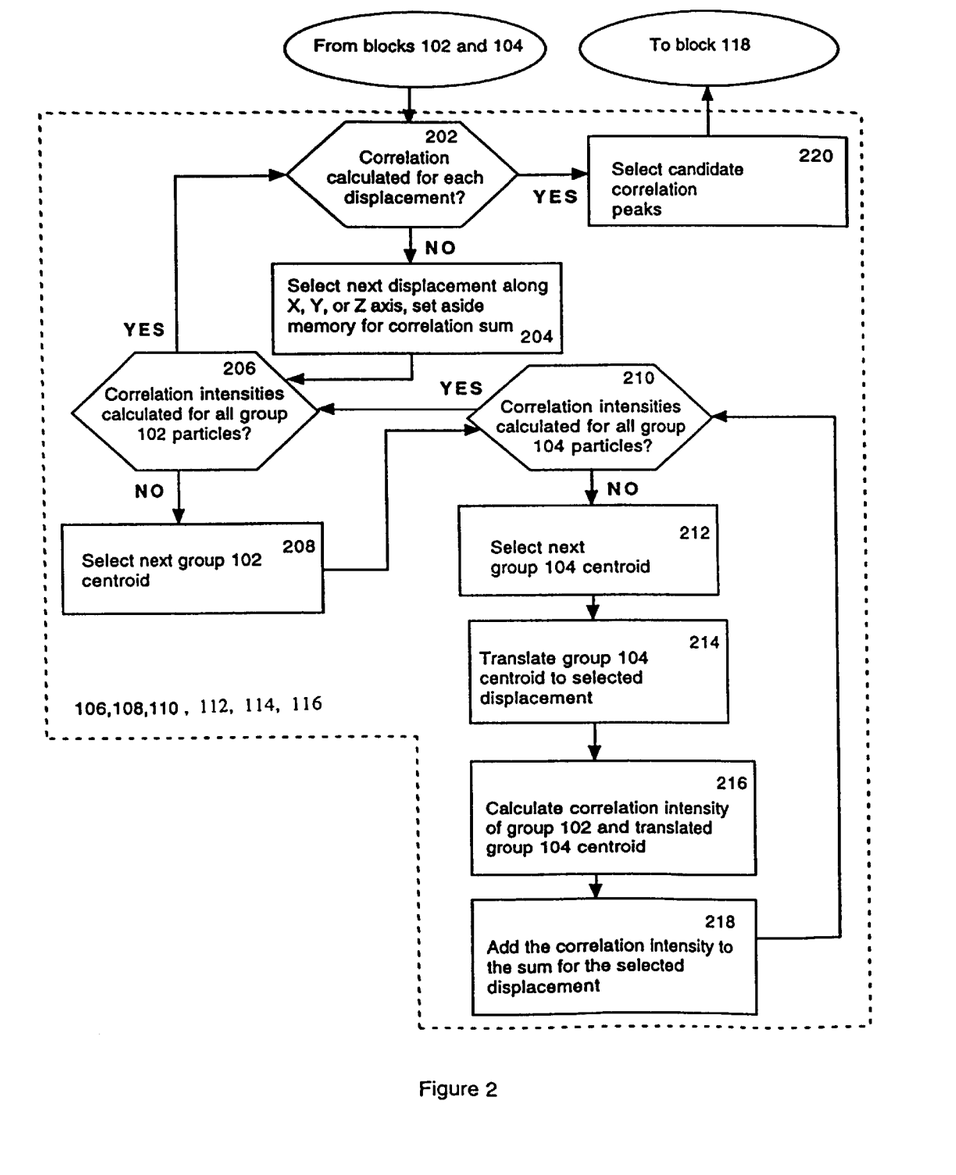
FIG. 2 is a flow diagram showing the details of the one-dimensional correlation algorithm of FIG. 1.

FIG. 2 shows the details of the one-dimensional correlation step of blocks 106, 108, and 110 of FIG. 1. The outer loop of this step runs over a set of one-dimensional displacements on the X-, Y-, or Z-axis. In step 202, the program checks whether correlation intensities have been calculated for each possible displacement. If so, then the completed list of correlation intensity values (one for each displacement) is passed to step 220, where a predetermined set of correlation intensity peaks, and their locations, is selected from the list. This candidate list is passed on to step 118 in FIG. 1 for further processing. If the correlation intensities have not been completely calculated, the next displacement along the X-, Y- or Z-axis is selected in step 204. Storage in memory is set aside for the correlation intensity associated with the selected displacement, and is initialized to zero.

The flow of the algorithm then passes to step 206 where the program checks whether the list of particle centroids in group 102 has been completely iterated over. If so, then the program control passes back to step 202 and checks to see whether correlation intensities are completely calculated. Otherwise, the next group 102 centroid is selected in step 108. In step 210, the program checks whether the list of particle centroids in group 104 has been completely iterated over. If so, then program control passes back to step 206. If not, then the next group 104 centroid is selected in step 212.

In step 214, the group 104 centroid is translated along the X-, Y- or Z-axis to the displacement which was selected in step 204. This is done by adding the selected displacement to the X-, Y- or Z-coordinate of the group 104 centroid. The correlation intensity between the (fixed) group 102 centroid selected in step 208 and the translated group 104 centroid is then calculated in step 216. The correlation intensity function is a monotonically decreasing function of the distance, along the selected axis, between the centroid pair, and may be taken to be integer-valued if the implementation is on a platform that does not support floating point computation. In the prototype implementation of the CCC algorithm, the correlation intensity function is at its peak when the displacement is zero, and drops off to zero linearly as the distance between the X-, Y- and Z-coordinates of the particle pair increases. In step 218, the correlation intensity calculated in step 216 is added to the sum for the selected displacement, which is stored in the memory set aside for this sum in step 204. Program control then passes back to step 210.

Figure 3:
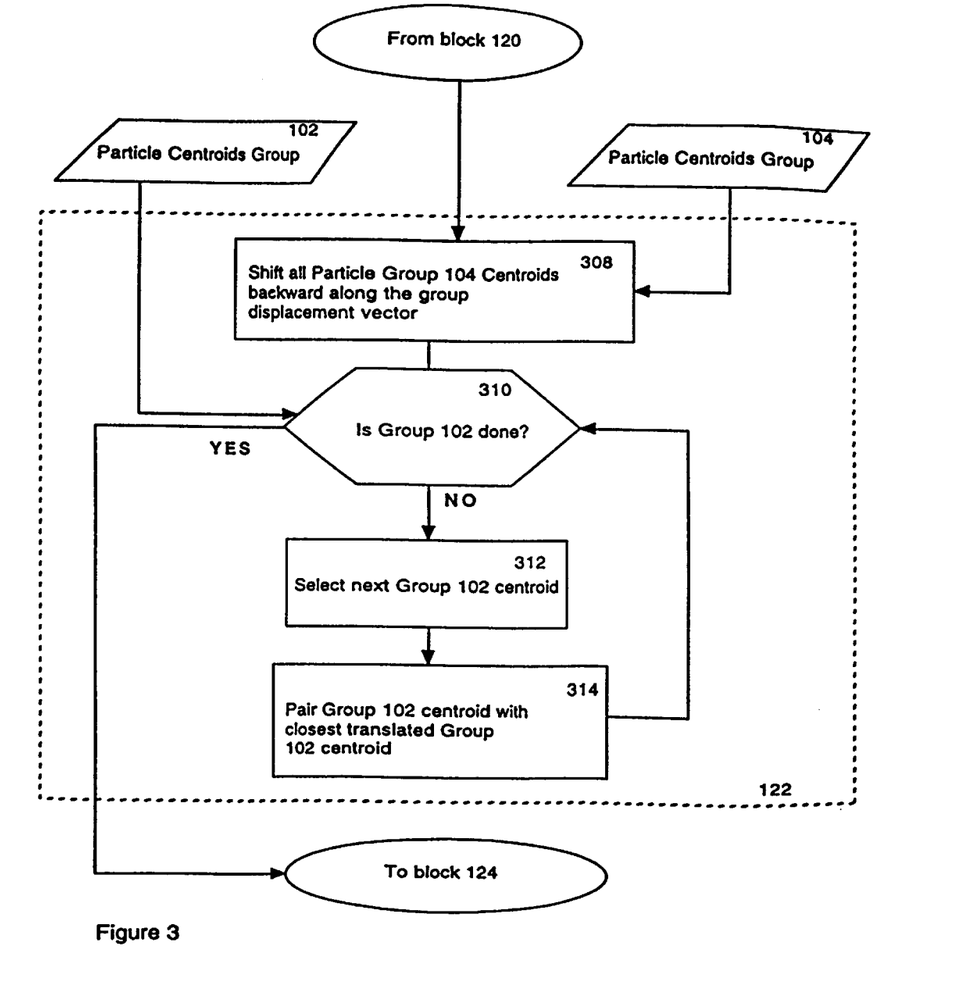
FIG. 3 is a flow diagram showing the details of the particle pairing algorithm of FIG. 1.

FIG. 3 is a detailed flow diagram of the particle pairing algorithm, step 122 of FIG. 1. The purpose of the particle pairing algorithm is to obtain the finest possible distribution of displacement vector estimates by pairing particle centroids in the two images or cubes. Particle centroid groups 102 and 104 are submitted to the particle pairing algorithm. In step 308, all of the particle centroids in group 104 are shifted back along the displacement vector which was obtained in block 120 of FIG. 1. If the assumption that there is no distortion in the displacement field is correct, the particle centroid pairs will now be stacked one on top of the other. In practice, small distortions are always to be expected, but the choice of small time and space windows for analysis should keep distortions to a minimum. In step 310, the program checks whether all group 102 particle centroids have been iterated over. If so, then all particle centroid pairs have been formed, and program control exits the particle pairing algorithm to block 124 in FIG. 1. If not, then the next (fixed) group 102 centroid is selected in step 312. In step 314, the translated group 104 centroids are searched, and the centroid which is closest to the selected group 102 centroid is found. Group 104 centroids which have already been paired with group 102 centroids are eliminated from consideration in this search. When the matching group 104 centroid is found, control passes back to step 310.

Figure 4:
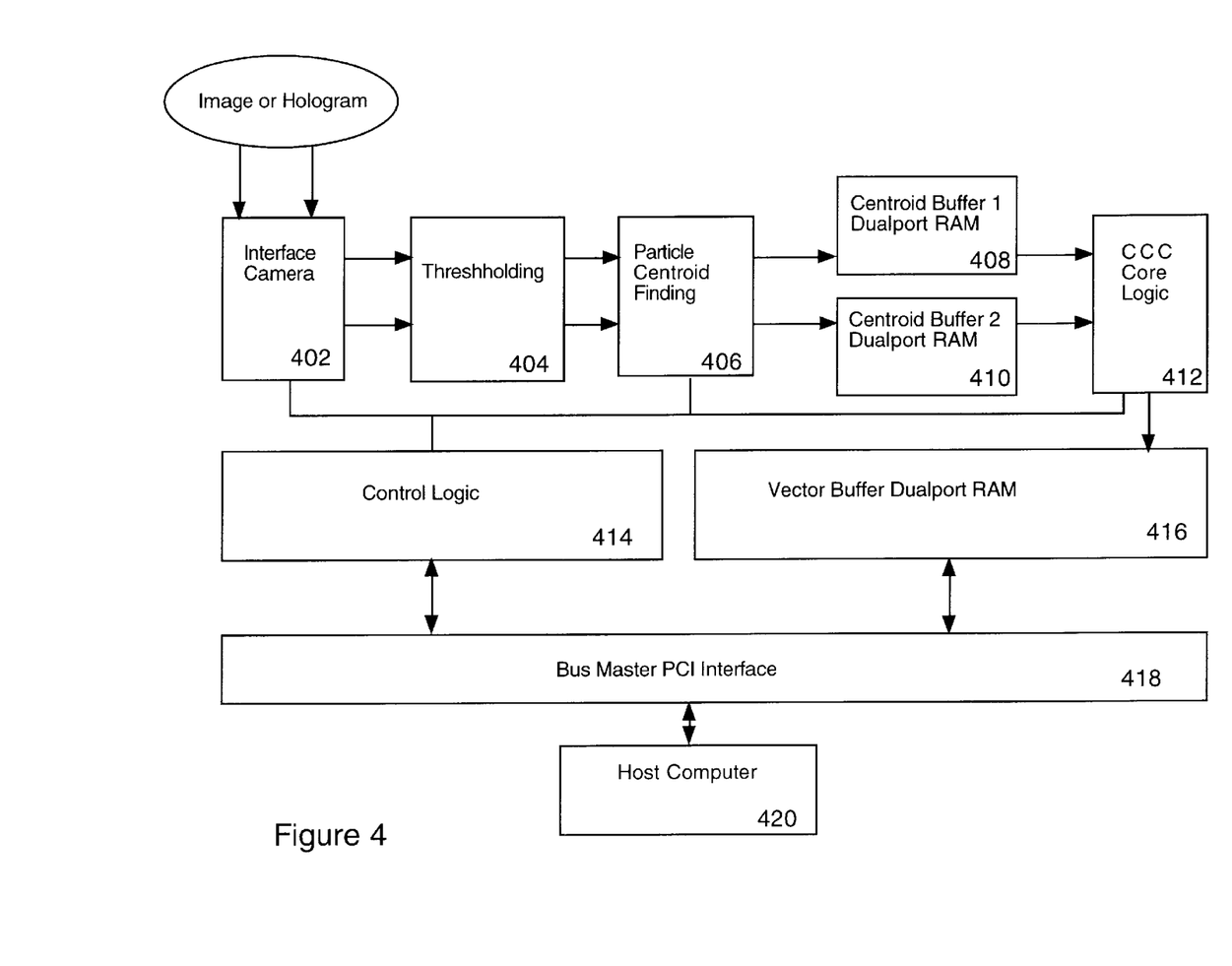
FIG. 4 is a diagram of a possible hardware implementation of the CCC algorithm of FIG. 1.

FIG. 4 is a block diagram for a possible hardware implementation of the CCC algorithm. It is emphasized that the CCC technique can be implemented either in hardware or software. A pair of images or holograms is captured and digitized by the camera interface 402 (for example, a CCD). Each pixel in the two data sets is compared with a threshhold value, set for particle detection, by the thresholding unit 404. If a pixel's value is higher than the threshold, its intensity and location are transferred to the particle centroid finding unit 406. Particle centroid unit 406 operates conventionally, and its built in logic validates the particle centroids found in the centroid finding process. The resulting centroid locations from the two exposures are stored separately in two dualport RAM buffers 408 and 410. The CCC core logic unit 412 takes as input the two sets of particle centroid locations and performs CCC operations, which are shown in detail in FIG. 5, at high speed. The resulting displacement vectors are stored in a dualport RAM buffer 416, which can be accessed by the PCI interface controller 418 for transferring data into the host computer 420.

FIG. 5 shows the outer control loop of main CCC algorithm 100. Note that references numbers roughly corresponding to the blocks in FIG. 4 are shown in paratheses, to indicate where functions might be performed in that hardware scheme. In steps 502 and 504, images or holograms 1 and 2 are captured. The time separation between the captures is on the order of a few microseconds, 15 ms in the prototype system.

In steps 506 and 508, particle centroids are extracted from each captured image or hologram using conventional methods. In steps 510 and 512, the particle centroids are separated into subsets based on a grid partition of the original image or hologram. In the prototype PIV system, each 1-kilobyte by 1-kilobyte image is divided into 32 by 32 interrogation cells, and in the prototype HPIV system, the entire 50 mm by 40 mm by 50 mm region is divided into 12500 interrogation cells, each of which corresponds to a cube which is 2 mm on a side.

In step 514, the program checks to see whether main CCC algorithm 100 has been run for every matched pair of particle centroid subsets in the grid partition. If so, then a complete set of group displacement vectors or particle pairs has been calculated for the entire image or hologram, and the program passes to block 524, where it exits with a list of vectors as output. If not, then the next matched pair of particle centroid groups is chosen in step 516.

Particle centroid groups 102 and 104 are submitted separately to step 100, the main CCC algorithm, which is shown in FIG. 1. The main CCC algorithm calculates either a group displacement vector for the pair of particle centroid groups, or a list of fine displacement vectors calculated during the particle pairing routine of step 122. From step 100, the flow passes back to step 514.

Figure 6:
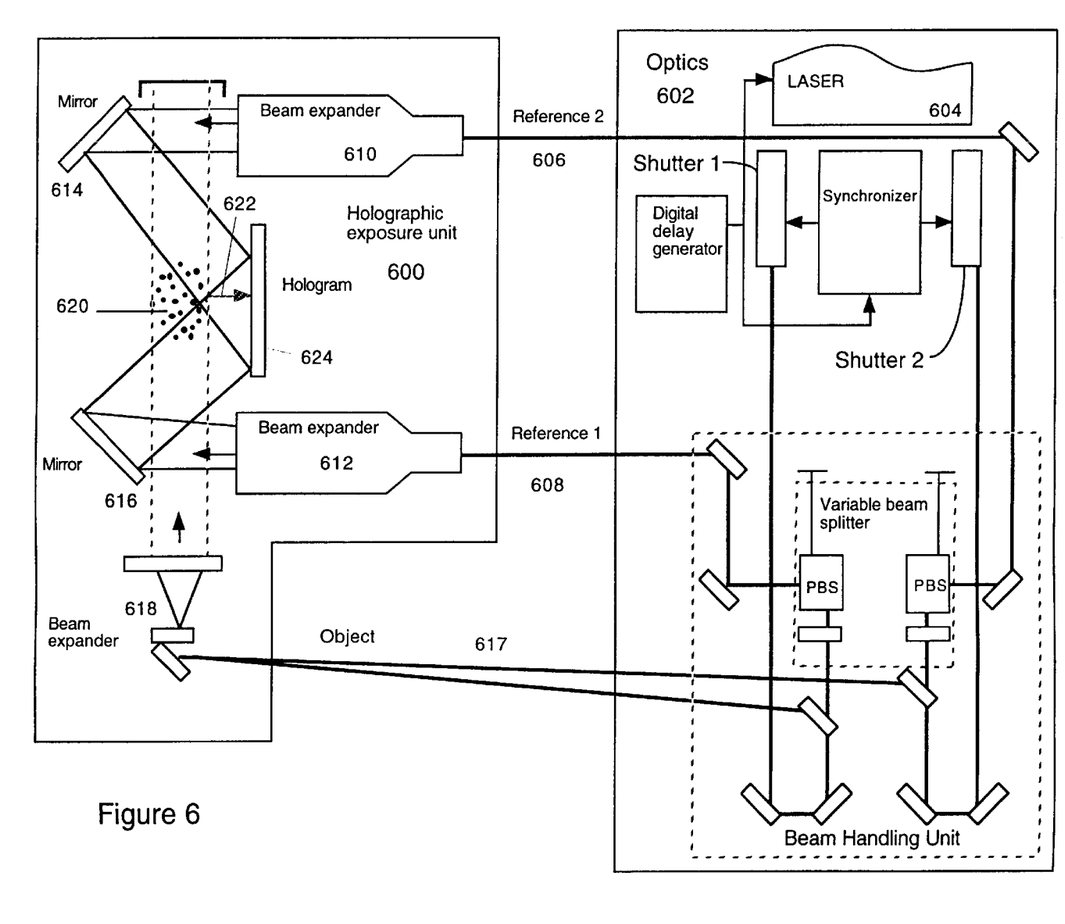
FIG. 6 is a schematic representation of the recording geometry and system configuration for the proposed HPIV system.

FIG. 6 shows a schematic representation of the off-axis HPIV recording unit 600. At the time of the recording, the dual injection-seeded Nd:YAG laser 604 generates two bursts of laser light of duration 8 ns each, separated by a small time interval which varies as a function of the flow speed. The optics 602 generates first a coherent reference beam 608, which is passed through beam expander 612. The reference wave is then reflected from mirror 616 onto hologram 624.

Simultaneously, a laser pulse 617 is directed through the beam handling unit through beam expander 618, and is scattered off of the particle field 620. The 90-degree component of scattering 622 interferes with the reference beam, and the interference pattern is recorded at time t1 on hologram 624.

At time t2=t1+dt, coherent reference beam 606 is diverted through beam expander 610, is reflected from mirror 614, and directed toward hologram 624. Simultaneously, a laser pulse 617 is directed through beam expander 618, and is scattered from the changed particle field 620. The 90-degree component of scattering 622 interferes with the reference beam, and the resulting (changed) interference pattern is recorded at time t2 on the same hologram 624. The component of scattering at 90 degrees is utilized for this recording because of its near-homogeneous intensity across a wide range of angles, and because of its superior optical performance (including shorter depth of focus, and lower noise). ***The 90-degree component of scattering has not been utilized in previous patented HPIV systems, because of its lower intensity: 90% of the scattered energy is contained in the near-forward scattering component. U.S. Pat. No. 05,548,419, incorporated here by reference, utilizes near forward scattering, which requires the use of large-aperture optics to increase depth-direction accuracy. To compensate for the high aberration common to large-aperture optics, phase conjugation is used, which increases the complexity of the system.

Figure 7:
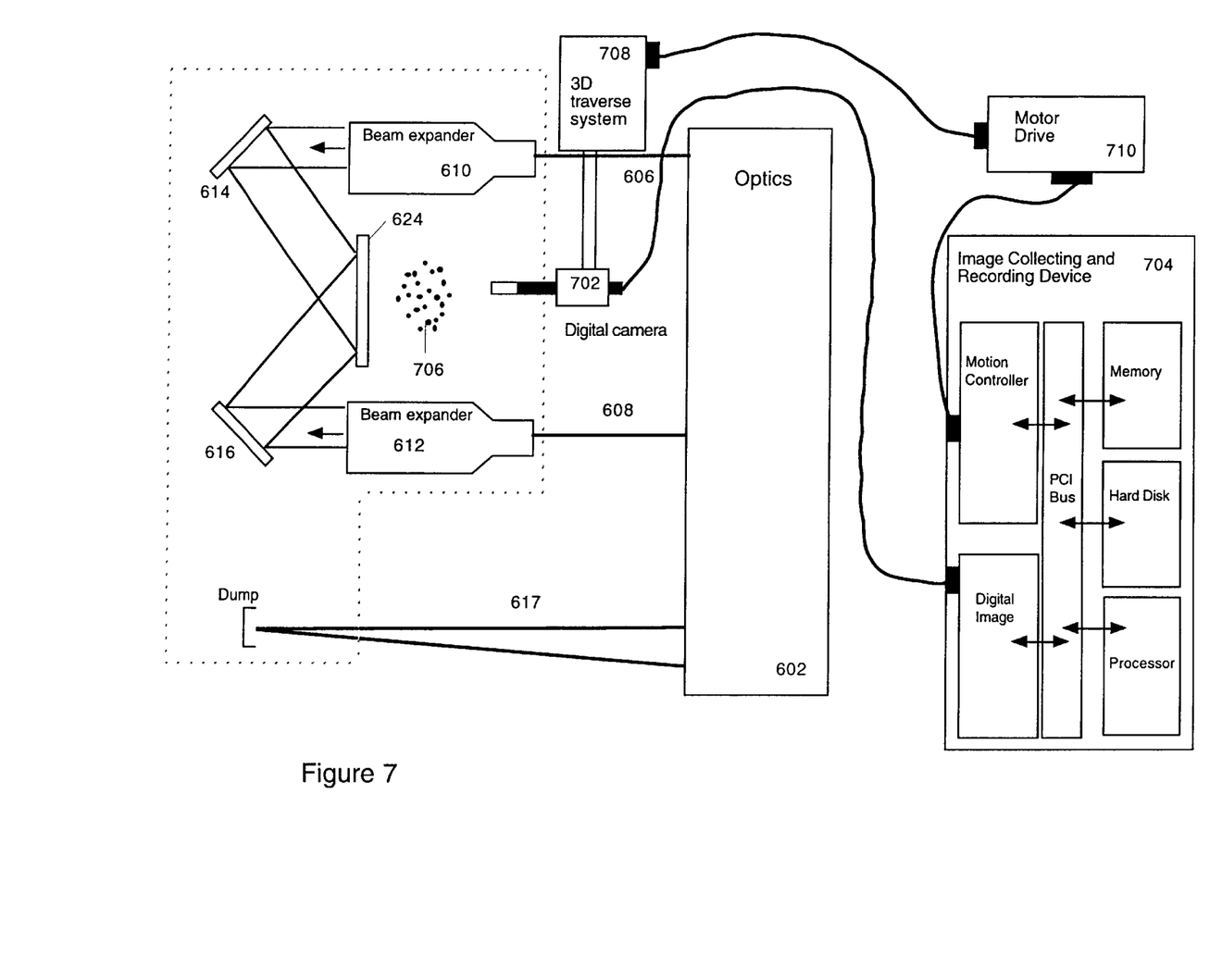
FIG. 7 is a schematic representation of the reconstruction geometry and system configuration for the proposed HPIV system.

FIG. 7 shows a schematic representation of the off-axis HPIV reconstruction system. Substantially the same optical configuration is used for reconstruction as for recording, so that the reconstruction may be done in situ. The object beam, however, is blocked since it is not needed for reconstruction. The laser 604 generates a coherent reference beam identical to reference beam 608, which passes through optics 602 and is diverted to beam expander 612 and mirror 616. Holographic recording medium 624 is placed in its initial position with the film emulsion facing the opposite direction to that of recording, so that the incident reference wave is the phase conjugate of the reference wave used in recording. The resulting reference wave falls upon hologram 624, and a reconstructed image 706 of the particle field at time t1 is generated, directly opposite the position of the original particle field 620. Similarly, a coherent reference beam identical to reference beam 606 can be generated, passed through optics 602, and diverted to beam expander 610 and mirror 614. The incident reference wave falls upon the same (reversed) holographic film 624, and a reconstructed image 706 of the particle field at time t2 is generated directly opposite the position of the original particle field.

The different reference waves make the use of a single holographic recording medium 624 possible for the recording of both holographic images. In this embodiment, the laser shutters are kept open during reconstruction, and every pulse is passed for continuous hologram reconstruction during the image acquisition. The reference beams 606 and 608 are generated alternately at frequency 10 Hz, so that the particle fields at time t1 and t2 are alternately reconstructed.

The three-dimensional reconstructed particle fields 706 are then interrogated with a planar imaging device for conversion to digital form. The present embodiment utilizes a high-resolution digital CCD camera 702 (Kodak ES1.0, 1 k by 1 k, 30 fps in the preferred embodiment) mounted on a three-dimensional traverse system 708 for capture. At any given time, camera 702 sees only an extremely thin slice, and small area, of a three-dimensional reconstructed hologram. The pitch in depth (distance between adjacent slices in the depth dimension) is kept small, so that particle images can be resolved in depth. The entire particle field is therefore decomposed into many three-dimensional interrogation cells. The operation of camera 702 and traverse system 708 are fully automated and controlled by a recording device 704, run from a processor (a 333 MHz Pentium II processor in the preferred embodiment). A PCI digital image framegrabber is hosted in the recording device 704 to perform image capture, and a motion controller is also installed to drive traverse system 708. Image acquisition and camera movement are synchronized with the laser pulses to ensure data integrity. Calculation of the particle centroids 406, and the CCC algorithm 412, are performed on-the-fly during the process of image acquisition, for the processing is fast enough to be done concurrent with image acquisition and new data capture. A speed of approximately one pair of image planes per second is achieved by the data capture and processing system in the current embodiment.

While the exemplary preferred embodiments of the present invention are described herein with particularity, those skilled in the art will appreciate various changes, additions, and applications other than those specifically mentioned, which are within the spirit of this invention.

What is claimed is:

1. Apparatus for recording holograms of particles in a fluid medium comprising:
    means for providing a volumetric object illumination beam passing through the medium for scattering off the particles;
    means for providing a first reference beam, coherent with the object illumination beam, at a first angle to interfere with the scattered object illumination beam; and
    an image recording element, adjacent to the medium apart from and substantially parallel to the object illumination beam, for forming a first recorded hologram, at a first time, of the interference pattern formed by the first reference beam and the scattered object illumination beam.

2. The apparatus of claim 1, further comprising:
    means for reconstructing the first recorded image from the hologram, including means for passing the first reference beam at the first angle through the hologram to form a first reconstructed image.

3. The apparatus of claim 2, further comprising means for recording a 2D image from a focal plane within the first reconstructed image.

4. The apparatus of claim 3, further comprising:
    means for obtaining a set of particle centroids from the first reconstructed image.

5. The apparatus of claim 1, wherein the medium is a fluid flow, and further comprising:
    means for providing a second reference beam, coherent with the object illumination beam, at a second angle to interfere with the scattered object illumination beam; and
    wherein the image recording element forms a second recorded hologram, at a second time, of the interference pattern formed by the second reference beam and the scattered object illumination beam.

6. The apparatus of claim 5, further comprising:
    means for reconstructing the first and second recorded images from the hologram, including
        means for passing the first reference beam at the first angle through the hologram to form a first reconstructed image; and
        means for passing the second reference beam at the second angle through the hologram to form a second reconstructed image.

7. The apparatus of claim 6, further comprising:
    means for recording 2D slices of the first and second reconstructed images, including
        means for recording a 2D image from a focal plane within the first reconstructed image; and
        means for recording a 2D image from a focal plane within the second reconstructed image.

8. The apparatus of claim 7, further including:
    means for obtaining a first set of particle centroids from the recorded 2D slices of the first reconstructed image; and
    means for obtaining a second set of particle centroids from the recorded 2D slices of the second reconstructed image.

9. The apparatus of claim 8, further comprising:
    means for separating each set of particle centroids into subsets based on a grid partition of the two reconstructed images;
    means for calculating 3D correlations between matching subsets of centroids from the two images; and
    means for computing a velocity vector for each pair of matched subsets based upon the relative location of the matched subset from the first reconstructed image and the matched subset from the second reconstructed image.

10. The apparatus of claim 9, further including means for pairing individual particle centroids in the two images based upon the calculated correlations.

11. The apparatus of claim 10, wherein the means for pairing individual centroids further comprises:
    means for translating each centroid of the second reconstructed image backward over the velocity vector of its respective subset velocity vector; and
    means for pairing each translated centroid with the nearest centroid from the first reconstructed image.

12. The apparatus of claim 10, wherein the means for pairing individual centroids further comprises:
means for translating each centroid of the first reconstructed image forward over the velocity vector of its respective subset velocity vector; and
means for pairing each translated centroid with the nearest centroid from the second reconstructed image.

13. The apparatus of claim 10, further including means for computing a velocity vector for each matched pair of centroids.

14. The apparatus of claim 10, wherein the means for calculating 3D correlations is implemented as means for calculating three 1D correlations.

* * * * *

UNITED STATES PATENT AND TRADEMARK OFFICE
CERTIFICATE OF CORRECTION

PATENT NO.    : 6,496,262 B1
DATED         : December 17, 2002
INVENTOR(S)   : Hui Meng and Ye Pu It is certified that error appears in the above-identified patent and that said Letters Patent is hereby corrected as shown below:

<u>Column 4,</u>
Lines 29 and 30, delete "and acquires planar images by scanning synchronized with the laser" and insert -- synchronized with the laser, and acquires planar images by scanning --.

Signed and Sealed this

Twenty-fifth Day of March, 2003

JAMES E. ROGAN
*Director of the United States Patent and Trademark Office*